United States Patent [19]

Houdard

[11] 4,242,641

[45] Dec. 30, 1980

[54] METHODS AND APPARATUS FOR DEMODULATING A DIFFERENTIALLY PHASE-MODULATED SIGNAL

[75] Inventor: Jean P. Houdard, Orsay, France

[73] Assignee: Le Materiel Telephonique, Boulogne-Billancourt, France

[21] Appl. No.: 27,055

[22] Filed: Apr. 4, 1979

[30] Foreign Application Priority Data

Apr. 6, 1978 [FR] France .................................. 78 10190

[51] Int. Cl.$^3$ ............................................. H03D 3/04
[52] U.S. Cl. .................................... 329/126; 329/110; 375/85
[58] Field of Search ....................... 329/110, 112, 126; 375/84–86

[56] References Cited

U.S. PATENT DOCUMENTS

| | | | |
|---|---|---|---|
| 3,535,452 | 10/1970 | Oswald | 375/85 |
| 3,938,052 | 2/1976 | Glasson et al. | 375/85 |
| 3,947,633 | 3/1976 | Burger | 375/84 |

Primary Examiner—David K. Moore
Attorney, Agent, or Firm—Roland Plottel

[57] ABSTRACT

The invention relates to methods and apparatus for demodulating a differentially phase-modulated digital input signal to produce an output signal representing the digital signal corresponding to the transmitted message.

The process comprises memorizing the last two digital samples of the input signal received, computing the series of digital sample phases of the input signal, before and after the last change of the input signal's initial phase, and then substituting for the difference between two phases having the same order number, the corresponding group of output signal bits.

Applicable in differentially phase-modulated signal transmission systems.

16 Claims, 4 Drawing Figures

METHODS AND APPARATUS FOR DEMODULATING A DIFFERENTIALLY PHASE-MODULATED SIGNAL

TECHNICAL FIELD

The present invention relates to method and apparatus for demodulating a differentially phase-modulated digital input signal to obtain an output signal representing the digital data corresponding to the transmitted message. When associated with an analogue-to-digital converter, the invention may also be used to demodulate a differentially phase-modulated analogue signal.

BACKGROUND OF THE INVENTION

Differential phase-modulation is widely employed to transmit both digital and digitally-encoded analog signals over transmission facilities such as microwave and co-oxial cable.

Heretofore, the circuitry required to demodulate such signals at the receiving location was complex and expensive.

SUMMARY OF THE INVENTION

It is thus an object of this invention to provide methods and apparatus for demodulating a differentially phase-modulated digital signal that overcomes the above and other problems.

The invention thus comprises a method for demodulating a differentially phase-modulated digital input signal y, comprising a stream of digital samples $y_j(n)$, $y_k(n)$ and $y_l(n)$ representative of sinusoidal signals priorly sampled at frequency F and encoded for example as signals $x_j$, $x_k$ and $x_l$ of frequency f, said samples succeeding each other in time upon each change of the initial phase of an analogue signal x representing the signal y before sampling and encoding, said method demodulating said input signal y to produce an output signal z representing the significant digital value of the transmitted message, characterized by the steps of:

(a) memorizing the last two received digital samples $y_k$ (1) and $y_k$ (2) of the input signal y;

(b) generating the series u(n) of digital samples of the series $y_k(n)$ from the two digital samples $y_k(1)$ and $y_k(2)$;

(c) calculating the series s(n) of the phases of the $x_k$ sinusoidal signal digital samples of initial phase $\phi_k$, from the series u(n) of digital samples of the sinusoidal signal $x_k$;

(d) comparing each digital sample y(n+i) of the input signal y with the digital sample of the same order u(n+i) of the series u(n) and then;

(e) ($\alpha$) if u(n+i) differs from y(n+i), or if y(n+i) is equal to $y_j(1)$:

generating the series v(n) of digital samples of series $y_j(n)$ from the two digital samples $y_j(1)$ and $y_j(2)$, while continuing to produce the series u(n) of the digital samples of the series $y_k(n)$;

comparing each digital sample of signal y with the digital sample of the same order of the series v(n);

computing the series t(n) of digital sample phases of the sinusoidal signal $x_l$ of initial phase $\phi_l$ from the series v(n) of the digital samples of sinusoidal signal $x_l$;

computing the phase difference $\phi_l-\phi_k$ between (a) each term of the series t(n) of digital sample phases of the sinusoidal signal $x_l$ and (b) the term having the same order number in the series of digital sample phases of the sinusoidal signal $x_k$;

substituting for the phase difference $\phi_l-\phi_k$ a group of bits of the output signal z selected to represent the phase difference $\phi_l-\phi_k$ in accordance with a pre-established law of correspondence; or ($\beta$) if u(n+i) is equal to y(n+i), or if y(n+i) is equal to $y_k(n+i)$:

computing the phase difference $\phi_k-\phi_j$ between (a) each term of the series s(n) of digital sample phases of the sinusoidal signal $x_k$ and (b) the term having the same order number of the series t(n) of digital sample phases of the sinusoidal signal $x_j$;

substituting for the phase difference $\phi_k-\phi_j$ a group of bits of output signal z selected to represent the phase difference $\phi_k-\phi_j$ in accordance with the said pre-established law of correspondence.

The present invention also discloses illustrative apparatus for implementing the method defined above.

The operation of the present invention will be more fully understood from the following description when taken with the appended drawings, in which:

DETAILED DESCRIPTION

Figure 1:
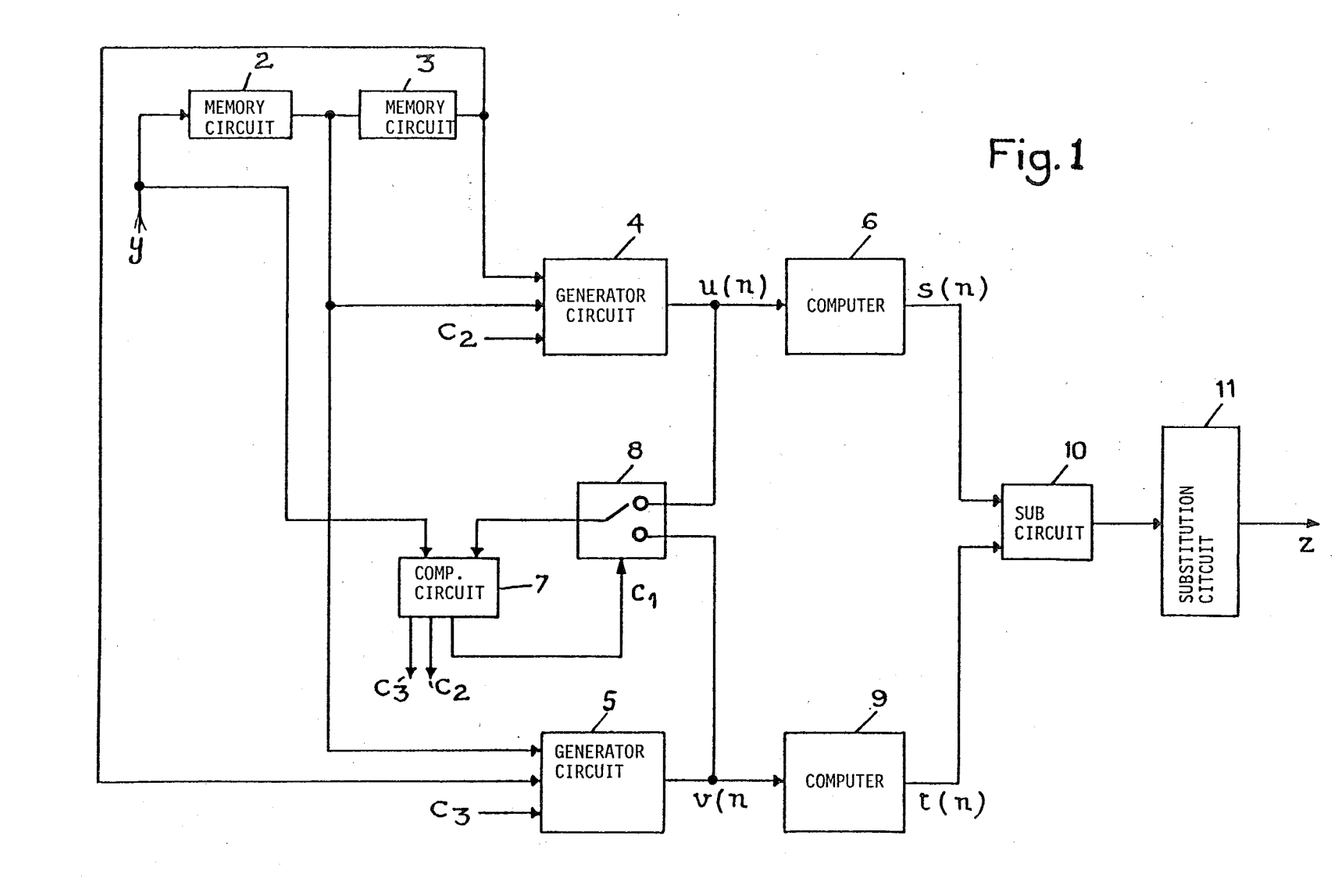
FIG. 1 is a block diagram of an illustrative demodulation device in accordance with the invention.

Referring to FIG. 1, it is seen that the differentially phase-modulated input signal y is applied to the input terminal of a first memory circuit 2. The input signal y consists of a series of digital samples such as $y_j(n)$, $y_k(n)$ and $y_l(n)$, representative of sinusoidal signals sampled at frequency F and encoded, such as $x_j$, $x_k$ and $x_l$, of frequency f, following each other in time at each change of initial phase of an analogue signal x representing signal y before sampling and encoding. The output terminal of first memory circuit 2 is connected to the input terminal of a second memory circuit 3. These two memories have sufficient capacity to the last two digital samples of the input signal y and are used to initialize either a first generator 4 or a second generator 5 by means of the two digital samples. In a preferred embodiment, the memories 2 and 3 each comprise a shift register.

If the first generator 4 has been initialized by means of the two digital samples of order number 1 and 2 of the series $y_k(n)$, i.e. $y_k(1)$ and $y_k(2)$, this generator produces the series u(n) of the digital samples of sinusoidal signal $x_k$ from the two digital samples $x_k(1)$ and $y_k(2)$. The digital samples of the series u(n) are fed to a first computing device 6 which calculates the series s(n) of the digital sample phases of sinusoidal signal $x_k$ from the series u(n) of the digital samples of sinusoidal signal $x_k$.

The digital samples of the series u(n) are also fed to a comparison device 7 via a first switching device 8.

The comparison device of 7 compares each digital sample u(n+i) of the series u(n) with the digital sample y(n+i) having the same order number of the input signal y.

The comparison result appears in the form of three order signals $C_1$, $C_2$ and $C_3$, controlling the first switching device 8, initialization of the first generator 4 and initialization of the second generator 5, respectively.

If $u(n+i)$ differs from $y(n+i)$, or again if $y(n+i)$ is equal to $y_l(1)$, signal $C_3$ orders initialization of the second generator 5 by means of the two digital samples of order numbers 1 and 2 of the series $y_l(n)$, i.e. $y_l(1)$ and $y_l(2)$.

The order signal $C_1$ of the first switching device 8 thus switches one of the input terminals of the comparison device 7 from the output terminal of the first generator 4 to the output terminal of the second generator 5.

The second generator 5 then produces the series $y(n)$ of digital samples of the sinusoidal signal $x_l$ from the two digital samples $y_l(1)$ and $y_l(2)$, the first generator 4 continuing to produce the series $u(n)$ of digital samples of the sinusoidal signal $x_k$. The digital samples of the series $v(n)$ are fed to a second computing device 9 which calculates the series $t(n)$ of the digital sample phases of the sinusoidal signal $x_l$ from the series $v(n)$ of digital samples of the sinusoidal signal $x_l$.

A subtracting circuit 10 generates the difference between each term of the series $s(n)$ of the digital sample phases of the sinusoidal signal $x_k$ calculated by the first computing device 6 and the term having the same order number in the series $t(n)$ of the digital sample phases of the sinusoidal signal $x_l$ calculated by the second computing device 9. Since the terms have the same order number, the phase difference is equal to the initial phase difference between the sinusoidal signals $x_l$ and $x_k$, i.e. $\phi_l - \phi_k$.

A substitution circuit 11 substitutes for the phase difference $\phi_l - \phi_k$ the group of bits of the output signal z selected for representing the phase difference $\phi_l - \phi_k$ in accordance with the predetermined law of correspondence.

An example of "the predetermined low of correspondence" may be the following

| Δφ | Z |
|---|---|
| 0° | 0 0 1 |
| 45° | 0 0 0 |
| 90° | 0 1 0 |
| 135° | 0 1 1 |
| 180° | 1 1 1 |
| 225° | 1 1 0 |
| 270° | 1 0 0 |
| 315° | 1 0 1 | where $\Delta\phi$ is the output signal of the substrat device 10 and Z the output signal of the substitution circuit 11.

The substitution circuit 11 may consist of a read only memory which is programmed so that when it is addressed with the output signal of the substract device 10 (i.e. with the signal $\Delta\phi$ coded in a digital code), it provides the value Z corresponding to the value $\Delta\phi$ according to the predetermined law of correspondence.

If $u(n+i)$ is equal to $y(n+i)$, or again if $y(n+i)$ is equal to $y_k(n+i)$, the subtracting circuit 10 generates the phase difference between each term of the series $s(n)$ of the digital sample phases of the sinusoidal signal $x_k$ calculated by the first computing device 6 and the term having the same order number of the series $t(n)$ of the digital sample phases of the sinusoidal signal $x_j$ calculated by the second computing circuit, the second generator having been previously initialized by means of the digital samples $y_j(1)$ and $y_j(2)$ by means of the control signal $C_3$ in order to produce the series of digital samples of the sinusoidal signal $x_j$.

This phase difference is equal to the initial phase difference between the sinusoidal signals $x_k$ and $x_j$, i.e. $\phi_k - \phi_j$.

The substitution circuit 11 substitutes for the phase difference $\phi_k - \phi_j$ the group of bits selected for representing the difference $\phi_k - \phi_j$ in accordance with the predetermined law of correspondence. In a preferred embodiment substitution circuit 11 comprises a read-only memory having stored therein the predetermined law of correspondence.

Figure 2:
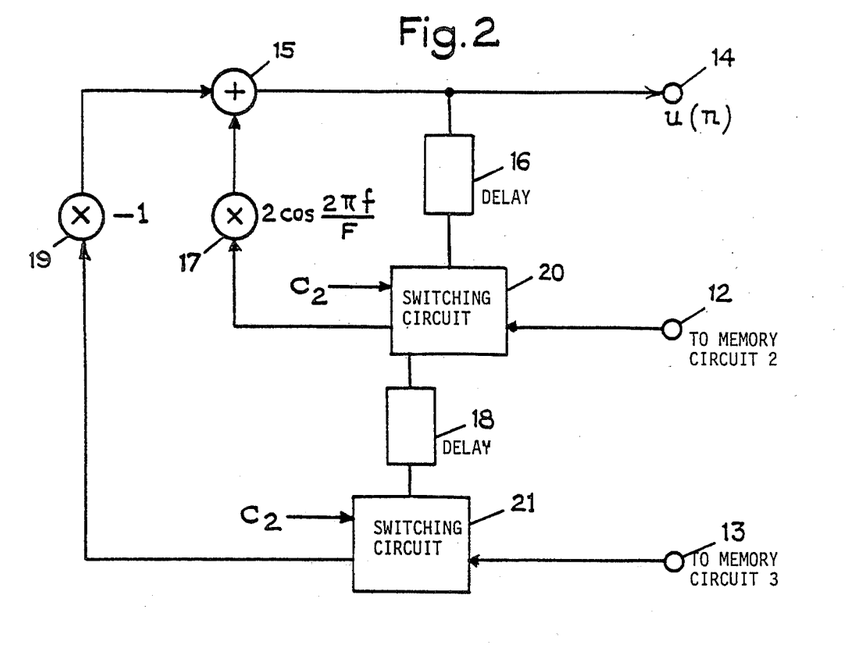
FIG. 2 is a block diagram of the first generator which is used in the demodulation device shown in FIG. 1.

Referring now to FIG. 2, it is seen that the first generator circuit 4 comprises two initialization terminals 12 and 13 and an output terminal 14. This generator is simply a recursive digital filter having the following transfer function, expressed in terms of z:

$$H_1(z) = \frac{1}{1 - 2(\cos\frac{2\pi f}{F})z^{-1} + z^{-2}}$$

This circuit possesses a first feedback loop connecting output terminal 14 to a first summing circuit 15 via a first delay device 16 connected in series with a first multiplier circuit 17 of coefficient $$2(\cos\frac{2\pi f}{F}).$$

This circuit possesses a second feedback loop connecting the junction of the delay device 16 and the multiplier circuit 17 to the summing device 15 via a second delay device 18 connected in series with a second multiply device 19 of coefficient $-1$. The junction between the delay device 16 and the multiply circuit 17 can be switched by means of a second switching device 20 controlled by the order signal initializing the first generator $C_2$ to the initialization terminal 12 connected to the output terminal of the first memory 2.

The junction between the delay device 18 and the multiplier circuit 19 may be switched by means of a third switching circuit 21 controlled by the order signal $C_2$ to the initialization terminal 13 connected to the output terminal of the second memory circuit 3. Signal $C_2$ is such that, by means of the switching circuits 20 and 21, the first and second feedback loops open to allow initialization and close once the first generator has been initialized.

In a preferred embodiment, the system including delay device 16 and switching circuit 20 comprises a first shift register having two write inputs connected to the initialization terminal 12 and the output terminal 14, respectively; an input for enabling one of the two write inputs (intended for receiving the order signal $C_2$); and an output connected to the multiplier circuit 17. The system including delay device 18 and switching device 21 comprises a second shift register identical with the first, having two write inputs connected to the initialization terminal 13 and the output of the first register, respectively; an input enabling one of the two write inputs (intended for receiving the order signal $C_2$); and an output connected to the multiplier circuit 19.

The series $u(n)$ generated by the first generator is a recurrent series defined by the following formula:

$$u(n) = 2(\cos\frac{2\pi f}{F}) \cdot u(n-1) - u(n-2).$$

It may be easily demonstrated that such a generator can produce the series of digital samples of a sinusoidal signal having an amplitude A, frequency f and initial phase $\phi$, and sampled at frequency F, from two initial values obtained at the sampling instants $$\frac{n-1}{F} \text{ and } \frac{n-2}{F}:$$

$$u(n-1) = A \sin[(n-1)\frac{2\pi f}{F} + \phi] \text{ and}$$

$$u(n-2) = A \sin[(n-2)\frac{2\pi f}{F} + \phi]$$

By substituting $$\theta = \frac{2\pi f}{F},$$

the following is obtained:

$$u(n-1) = A \sin[(n-1)\theta + \phi]$$

$$u(n-2) = A \sin[(n-2)\theta + \phi]$$

$$u(n) = 2A \cos\theta \cdot \sin[(n-1)\theta + \phi] - A \sin[(n-2)\theta + \phi]$$

$$u(n) = 2A \cos\theta \cdot [\sin(n\theta + \phi) \cdot \cos\theta - \sin\theta \cdot \cos(n\theta + \phi)] - A[\sin(n\theta + \phi) \cdot \cos 2\theta - \sin 2\theta \cdot \cos(n\theta + \phi)]$$

$$u(n) = A \sin(n\theta + \phi)[2\cos^2\theta - \cos 2\theta] + A\cos(n\theta + \phi)[\sin 2\theta - 2\sin\theta\cos\theta]$$

i.e.:

$$u(n) = A \sin(n\theta + \phi)$$

or again:

$$u(n) = A \sin(n\frac{2\pi f}{F} + \phi)$$

It is thus seen that u(n) represents the sample of a sinusoidal signal having an amplitude A, frequency f and initial phase $\phi$, sampled at frequency F at the sampling instant n/F.

The second generator 5 is identical with first generator 4 illustrated in FIG. 2, and operates in the same manner by replacing the initialization order signal $C_2$ with the initialization order signal $C_3$.

When a difference is detected at the output of the comparison circuit 7, the order signal $C_1$ of the first switching circuit 8 becomes active, whilst the order signals $C_2$ and $C_3$ of the second switching circuit 20 and of the third switching circuit 21 become active, every other time.

Figure 3:
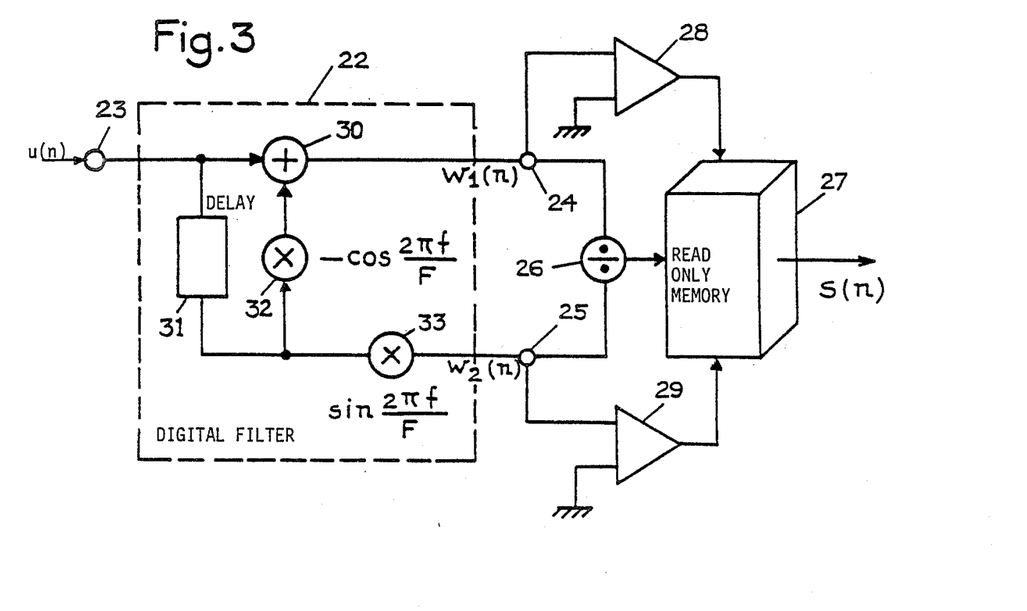
FIG. 3 is a block diagram of the first computing device which is used in the demodulation device shown in FIG. 1.

Referring now to FIG. 3, it is seen that the first computer 6 comprises firstly a non-recursive digital filter 22 possessing an input terminal 23 connected to the output terminal 14 of the first generator and two output terminals 24 and 25, secondly dividing circuit 26 having two input terminals connected to the two output terminals of the digital filter 22, and thirdly a read-only memory circuit 27 addressed on the one hand by the output signal of the dividing circuit 26 and on the other hand by the output signal of a first sign detector 28 and by the output signal of a second sign detector 29. The first sign detector 28 is fed with the signal present on output terminal 24, whilst the second sign detector 29 is fed with the signal present on output terminal 25.

The digital filter 22 has the following transfer function, expressed in terms of z:

$$H_2(z) = 1 - e^{-j\frac{2\pi f}{F}} \cdot z^{-1}$$

and including a second adding circuit 30, a third delay circuit 31, a third multiplier circuit 32 of coefficient $$-\cos\frac{2\pi f}{F},$$

and a fourth multiplier circuit 33 of coefficient $$\sin\frac{2\pi f}{F}.$$

In a preferred embodiment, the third delay circuit 31 comprises a third register identical with the first and second shift registers used in the first and second generators. The real and imaginary parts of the output signal of digital filter 22 are obtained on output terminals 24 and 25 of this filter.

Let $w_1(n)$ and $w_2(n)$ be the series of digital samples produced on output terminals 24 and 25, respectively, of digital filter 22, u(n) representing the series of digital samples fed to input terminal 23.

As described above, u(n) appears in the form:

$$u(n) = A \sin(n\theta + \phi)$$

It is seen from FIG. 3 that:

$$w_1(n) = u(n) - \cos\theta \cdot u(n-1)$$

or again:

$$w_1(n) = A \sin(n\theta + \phi) - \cos\theta \cdot A \sin[(n-1)\theta + \phi]$$

$$w_1(n) = A \sin(n\theta + \phi) - A \cos\theta[\sin(n\theta + \phi) \cdot \cos\theta - \sin\theta \cdot \cos(n\theta + \phi)]$$

$$w_1(n) = A \sin(n\theta + \phi)(1 - \cos^2\theta) + A \sin\theta \cdot \cos\theta \cdot \cos(n\theta + \phi)$$

$$w_1(n) = A[\sin(n\theta + \phi) \sin^2\theta + \sin\theta \cdot \cos\theta \cdot \cos(n\theta + \phi)]$$

$$w_1(n) = A \sin\theta[\sin(n\theta + \phi) \cdot \sin\theta + \cos\theta \cdot \cos(n\theta + \phi)]$$

$$w_1(n) = \sin\theta \cdot A \cos[(n-1)\theta + \phi]$$

It is also seen from FIG. 3 that:

$$w_2(n) = \sin\theta \cdot u(n-1)$$

or again:

$$w_2(n) = \sin\theta \cdot A \sin[(n-1)\theta + \phi]$$

The dividing circuit 26 produces a series of digital samples $w_3(n)$ such that:

$$w_3(n) = \frac{w_2(n)}{w_1(n)}, \text{ i.e.:}$$

$$w_3(n) = \tan[(n-1)\theta + \phi]$$

Knowing the signs of $w_1(n)$ and $w_2(n)$, and the value of $w_3(n)$, it is possible to deduce the value of the phase $(n-1)\theta + \phi$. For this purpose, read-only memory 27 contains a tangent table and is addressed by the output signals of the dividing circuit 26 and the sign detectors 28 and 29. The series of phases s(n) appears on the output of memory 27.

The second computing device 9 producing the series of phases t(n), is identical with the first computing device and operates in the same manner.

Figure 4:
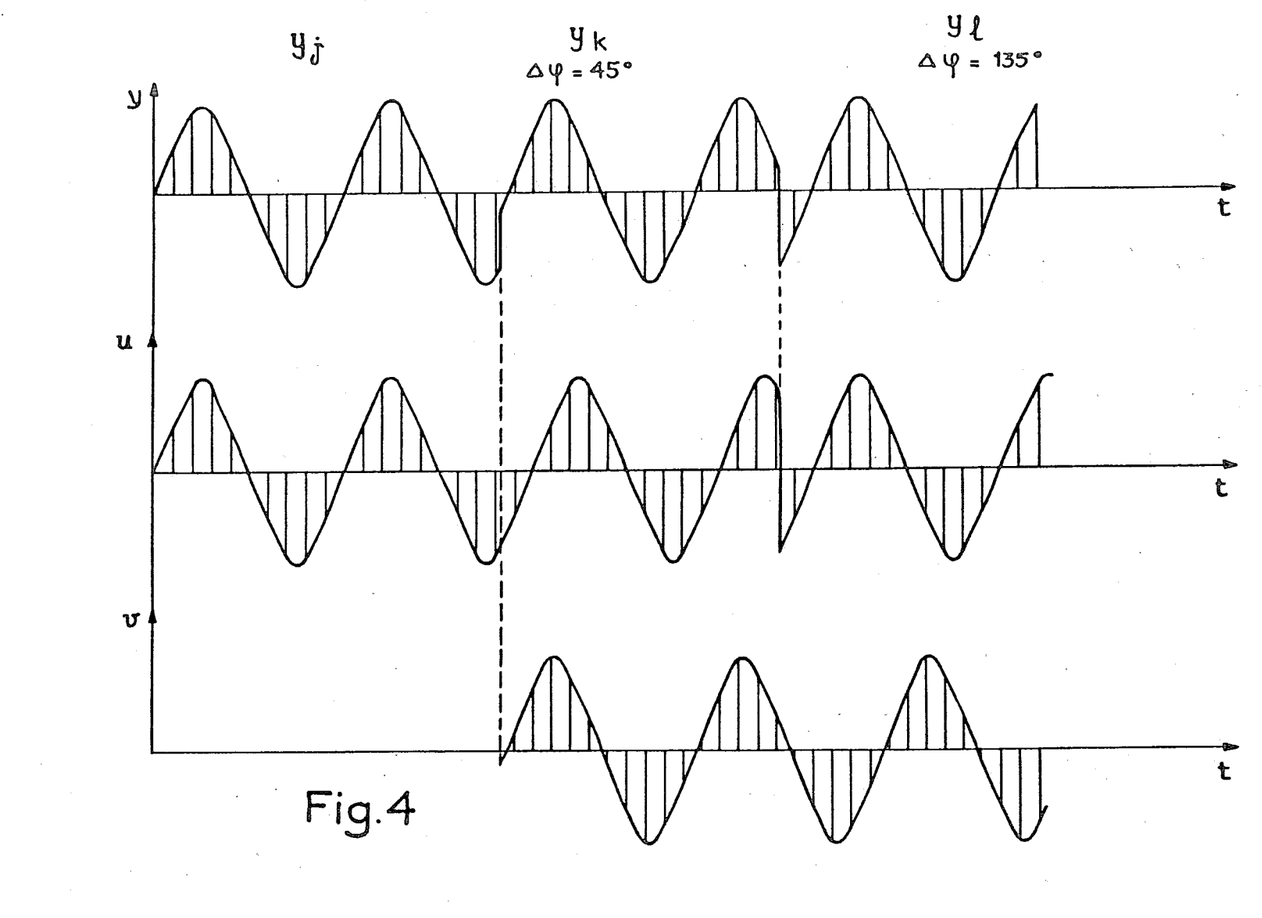
FIG. 4 is an example of wave forms of signals y, u and v defined at FIG. 1.

An example of wave forms of signals y, u and v is given at FIG. 4. The signal y consists for example of a succession of three sinusoidal signals sampled and encoded: $y_j$, $y_k$ and $y_1$. The difference between the phase of the sinusoidal signal $y_k$ and the phase of the sinusoidal signal $y_j$ has been chosen equal to 45°. The difference between the phase of the sinusoidal signal $y_1$ and the phase of the sinusoidal signal $y_k$ has been chosen equal to 135°. These values have been chosen among the values of $\Delta\phi$ given in the predetermined law of correspondance. These three sinusoidal signals have same amplitude and same frequency.

While the sinusoidal signals $y_k$ and $y_1$ are present, the generator 4 (for example) provides a signal u which is a sinusoidal signal, sampled and encoded, identical to the sinusoidal signal, encoded and sampled, $y_j$. While the sinusoidal signals $y_k$ and $y_1$ are present, the generator 5 provides a signal v which is a sinusoidal signal, sampled and encoded, identical to the sinusoidal signal, sampled and encoded $y_k$.

Let the signals u (t) and v (t) be written as follows:

$$u(t) = A \sin(wt + \phi) \text{ and}$$

$$v(t) = A \sin(wt + \phi + \Delta\phi)$$

The corresponding signals s (t) and t (t) will then be written $$s(t) = wt + \phi \text{ and}$$

$$t(t) = wt + \phi + \Delta\phi$$

The signals s and t have not been represented on the diagram but they would be obtained from u (t) and v (t) as follows:

$$s(t) = (1/A) \text{ Arc sin } u(t) \text{ and}$$

$$t(t) = (1/A) \text{ Arc sin } v(t)$$

The signals u (n), v (n), s (n) and t (n) are the signals u (t), v (t), s (t) and t (t) sampled and encoded.

The output signal of the substract device 10 has then the value $\Delta\phi$ coded in a digital code. And the signal Z has the digital value corresponding to $\Delta\phi$ in the predetermined law of correspondance.

Although the principles of the present invention are described above in relation with practical examples, it should be clearly understood that the said description is given as an example only and does not limit the scope of the present invention.

I claim:

1. A process for demodulating a differential phase-modulated digital input signal y consisting of a series of digital samples such as $y_j(n)$, $y_k(n)$ and $y_1(n)$, representative of sinusoidal signals sampled at frequency F and encoded, such as $x_j$, $x_k$ and $x_1$, of frequency f, following each other in time at each change of initial phase of the analogue signal x representing signal y before sampling and encoding, a process for demodulating the said input signal y to produce an output signal z representing the digital data corresponding to the transmitted message, characterized by the fact that it consists in:

(a) memorizing the last two received digital samples of the input signal y;

(b) initializing a first generator by means of two memorized digital samples, such as $y_k(1)$ and $y_k(2)$;

(c) producing by means of the first generator the series u(n) of the digital samples of the series $y_k(n)$ from the two digital samples $y_k(1)$ and $y_k(2)$;

(d) calculating by means of a first computing device the series s(n) of the phase of the $x_k$ sinusoidal signal digital samples of initial phase $\phi_k$, from the series u(n) of digital samples of the sinusoidal signal $x_k$;

(e) comparing each digital sample y(n+i) of the input signal y with the digital sample of the same order u(n+i) of the series u(n) produced by the first generator;

(f) ($\alpha$) if u(n+i) differs from y(n+i), or again if y(n+i) is equal to $y_1(1)$:

initializing a second generator by means of the two digital samples $y_1(1)$ and $y_1(2)$;

producing by means of the second generator the series v(n) of the digital samples of series $y_1(n)$ from the two digital samples $y_1(1)$ and $y_1(2)$, the first generator continuing to produce the series u(n) of the digital sample of the series $y_k(n)$;

comparing each digital sample of signal y with the digital sample of the same order of the series v(n) produced by the second generator;

computing by means of a second computing device the series t(n) of the digital sample phases of the sinusoidal signal $x_1$ of initial phase $\phi_1$ from the series v(n) of the digital samples of sinusoidal signal $x_1$;

expressing the phase difference $\phi_1 - \phi_k$ between each term of the series t(n) of the digital sample phases of the sinusoidal signal $x_1$ calculated by the second computing device and the term having the same order number in the series s(n) of digital sample phases of the sinusoidal signal $x_k$ calculated by the first computing device;

substituting for the phase difference $\phi_1 - \phi_k$ the group of bits of the output signal z selected to represent the phase difference $\phi_1 - \phi_k$ in accordance with a pre-established law of correspondence;

($\beta$) if u(n+i) is equal to y(n+i), or again if y(n+i) is equal to $y_k(n+i)$:

expressing the phase difference $\phi_k - \phi_j$ between each term of the series s(n) of the digital sample phases of the sinusoidal signal $x_k$ calculated by the first computing device and the term having the same order number of the series t(n) of the digital sample phases of the sinusoidal signal $x_j$ calculated by the second computing device, the second generator having been previously initialized by the digital samples $y_j(1)$ and $y_j(2)$ in order to provide the series of digital samples of the sinusoidal signal $x_j$;

substituting for the phase difference $\phi_k - \phi_j$ the group of bits of output signal z selected for representing the phase difference $\phi_k - \phi_j$ in accordance with the said law of correspondence.

2. A device for implementing the process in accordance with claim 1, characterized by the fact that it possesses first and second memories for memorizing the last two received digital samples of the input signal y, a first generator for producing the series of digital samples u(n), a first computing device for calculating the series of phases s(n), a second generator for producing the series of digital samples v(n), a second computing device for calculating the series of phases t(n), a comparison device for comparing each digital sample of the input signal y with the digital sample having the same order number of one of the series u(n) and v(n), a first switching device for switching one output terminal of one of the generators to the output terminal of the other generator, depending on the comparison result, a subtract device for expressing the phase difference between each term of the series of phases calculated by one of the computing devices and the term having the same order number of the series of phases calculated by the other computing device, and a substitution device containing the predetermined law of correspondence for substituting for the phase difference expressed by the substract device the group of bits of the output signal z selected to represent this phase difference in accordance with the predetermined law of correspondence.

3. A device in accordance with claim 2, characterized by the fact that the first memory presents an input terminal intended for receiving the input signal y and an output terminal connected to the input terminal of the second memory device, to the first and second generators, and by the fact that the second memory device presents an output terminal connected to the first and second generators.

4. A device in accordance with claim 3, characterized by the fact that the first generator is a recursive digital filter having a transfer function expressed in terms of z:

$$H_1(z) = \frac{1}{1 - 2(\cos\frac{2\pi f}{F})z^{-1} + z^{-2}}$$

possessing two initialization inputs and an output terminal, comprising a first feedback loop connecting the recursive digital filter output terminal to a first add device via a first delay device connected in series with a first multiply device of coefficient $$2(\cos\frac{2\pi f}{F}),$$

a second feedback loop connecting the junction of the first delay device and the first multiply device to the first add device via a second delay device connected in series with a second multiply device of coefficient −1, the junction of the first delay device and the first multiply device being switchable by means of a second switching device to the initialization terminal connected to the output terminal of the first memory device, and the junction of the second delay device and second multiply device being switchable by means of a third switching device to the initialization terminal connected to the output terminal of the second memory device.

5. A device in accordance with claim 4, characterized by the fact that the second generator is identical with the first generator.

6. A device in accordance with claim 5, in which the first computing device possesses a divide device possessing two input terminals and one output terminal, and a read-only memory containing a tangent table addressed on the one hand by the output signal of the divide device and on the other hand by the output signals of a first sign detector and a second sign detector, each of the sign detectors possessing an input terminal, characterized by the fact that it possesses a non-recursive digital filter having the following transfer function expressed in z:

$$H_2(z) = 1 - e^{-j\frac{2\pi f}{F}} \cdot z^{-1}$$

possessing an input terminal connected to the output terminal of the first generator and two output terminals producing the real and imaginary parts of the non-recursive digital filter output signal, each of them being connected to one of the output terminals of the divide device and to the input terminal of one of the sign detectors.

7. A device in accordance with claim 6, characterized by the fact that the second computing device is identical with the first computing device.

8. A device in accordance with claim 7, characterized by the fact that the comparison device possesses an input terminal for receiving the input signal y, an input terminal connected to the output terminal of the first switching unit and an output terminal producing the signals controlling the first, second and third switching devices.

9. A device in accordance with claim 8, characterized by the fact that the subtract device possesses an input terminal connected to the output terminal of the first computing device, an input terminal connected to the output terminal of the second computing device, and an output terminal producing the input signal of the substitution device.

10. A method for demodulating a differentially phase-modulated digital input signal y comprising a series of digital samples $y_j(n)$, $y_k(n)$ and $y_l(n)$, representative of sinusoidal signals priorly sampled at frequency F and encoded, for example, as signals $x_j$, $x_k$ and $x_l$ of frequency f, said samples following each other in time upon each change of the initial phase of the analogue signal x representing the signal y before sampling and encoding, said method for demodulating said input signal y to produce an output signal z corresponding to the transmitted message, characterized by the steps of:
  (a) memorizing the last two received digital samples yk(1) and yk(2) of the input signal y;
  (b) generating the said series u(n) of digital samples of the series $y_k(n)$ from said digital samples yk(1) and yk(2);
  (c) calculating the series s(n) of the phase of the $x_k$ sinusoidal signal digital samples of initial phase $\phi_k$, from the series u(n) of digital samples of the sinusoidal signal $x_k$;
  (d) comparing each digital sample y(n+i) of the input signal y with the digital sample of the same order u(n+i) of the series u(n); and then
  (e) (a) if u(n+i) differs from y(n+i), or if y(n+i) is equal to $y_j(1)$:
    generating the series v(n) of digital samples of series $y_j(n)$ from the two digital samples $y_j(1)$ and $y_j(2)$, while continuing to produce the series u(n) of the digital samples of the series $y_k(n)$;
    comparing each digital sample of signal y with the digital sample of the same order of the series v(n);
    computing the series t(n) of digital sample phases of the sinusoidal signal $x_l$ of initial phase $\phi_l$ from the series v(n) of digital samples of sinusoidal signal $x_l$;

computing the phase difference of $\phi_l - \phi_k$ between (a) each term of the series t(n) of digital sample phases of the sinusoidal signal $x_l$ and (b) the term having the same order number in the series s(n) of digital sample phases of sinusoidal signal $x_k$; and substituting for the phase difference $\phi_l - \phi_k$ a group of bits of the output signal z selected to represent the phase difference $\phi_l - \phi_k$ in accordance with a preestablished law of correspondence; or (b) if u(n+i) is equal to y(n+i), or if y(n+i) is equal to $y_k$(n+i):

computing the phase difference $\phi_k - \phi_j$ between (a) each term of the series s(n) of digital sample phases of the sinusoidal signal $x_k$ and (b) the term having the same order number of the series t(n) of digital sample phases of the sinusoidal signal $s_j$;

substituting for the phase difference $\phi_k - \phi_j$ a group of bits of the output signal z selected to represent the phase difference $\phi_k - \phi_j$ in accordance with the said preestablished law of correspondence.

11. Apparatus for demodulating a differentially phase-modulated digital input signal y comprising a series of digital samples $y_j(n)$, $y_k(n)$, $y_l(n)$, representative of sinusoidal signals priorly sampled at frequency F and encoded, for example, as signals $x_j$, $s_k$, and $x_l$ of frequency f, said samples following each other in time upon each change of the initial phase of the analogue signal x representing the signal y before sampling and encoding, said apparatus demodulating said input signal y to produce an output signal z representing the digital data corresponding to the transmitted message, characterized by:

first (2; FIG. 1) and second (3) memory circuits connected to the source of the incoming digital signal y for memorizing the last two digital samples thereof received by said apparatus;

a first generator circuit (4) connected to the output of said first and second memory circuits for generating a series u(n) of digital samples of the series $x_k(n)$ from the samples stored in said first and second memories;

a first computing circuit (6) connected to the output of said first generator circuit for generating the series s(n) of the phases of the $X_k$ sinusoidal signal digital samples of initial phase $\phi_k$, from said series u(n);

a second generator circuit (5) connected to the output of said first and second memory circuits for generating a series V(n) of digital samples of the series $y_l(n)$ from the samples stored in said memories;

a second computing circuit (9) connected to the output of said second generator circuit for generating the series t(n) of the phases of the $X_l$ sinusoidal signal digital samples of initial phase $\phi_l$ from said series v(n);

a comparison circuit (7) connected to said source of the incoming digital signal and to the outputs of said first and second generator circuits for comparing each digital sample of the input signal y with the digital sample of the same order number of one of said series u(n) and v(n);

a first switching circuit (8), connected to and controlled by an output from said comparison circuit, for switching on input to said comparison circuit between the output of said first generator circuit and said second generator circuit, depending upon the results of said comparison, a subtracting circuit (10), connected to the outputs of said first and second computing circuits, for generating the phase difference between each term of the series of phases generated by said first computing circuit and the term having the same order number in the series of phases generated by said second computing circuit; and a substitution circuit connected to the output of said subtracting circuit and having stored therein a pre-determined law of correspondence for substituting for each phase difference generated by said subtracting circuit a group of bits in the output signal Z selected to represent this phase difference in accordance with said predetermined law.

12. The apparatus according to claim 11 characterized in that said first generator circuit comprises a recursive digital filter having a transfer function, expressed in terms of Z:

$$H_1(z) = \frac{1}{1 - 2(\cos \frac{2\pi f}{F})z^{-1} + z^{-2}}$$

said filter including first (c2) and second (c3) initialization inputs and on output (14), and being further characterized by:

a first feedback loop connecting the recursive filter output (14) to one input of an adding circuit (15) via a first delay circuit (16) serially connected with a first multiplier circuit (17) of coefficient $$2 \cos \left( \frac{2\pi f}{F} \right);$$

a second feedback loop connecting the junction of said first delay circuit (16) and said first multiplier circuit (17) to the other input of said first adding circuit (15) via a second delay circuit (18) serially connected with a second multiplier circuit (19) of coefficient $-1$;

a second switching circuit (20) for switching the junction of said first delay circuit and said first multipler circuit to the output (12) of said first memory circuit; and a second switching circuit (21) for switching the junction of said second delay line and said second multiplier circuit to the output (13) of said second memory circuit.

13. The apparatus according to claim 12 characterized in that said second generator circuit is substantially identical to said first generator circuit.

14. The apparatus according to claim 13 characterized in that said first computing circuit (6) comprises:

a non-recursive digital filter (22; FIG. 3) having a transfer function, expressed in Z:

$$h_2(Z) = 1 - e^{-j \frac{2\pi f}{F}} \cdot z^{-1},$$

said digital filter having an input (23) connected to the output of said first generating circuit and two output terminals (24, 25) respectively carrying the real and imaginary components of the digital filter output signal;

first (28) and second (29) sign detectors respectively connected to the real and imaginary output terminals of said filter;

a dividing circuit (26) having first and second inputs respectively connected to the real and imaginary output terminals of said filter; and a read-only memory circuit (27) having stored therein a table of tangents, said read only memory being addressed by the output of said dividing circuit and by the respective outputs of said first and second sign detectors.

15. The apparatus according to claim 14 characterized in that said second computing circuit is substantially identical with said first computing circuit.

16. The apparatus according to claim 15 characterized in that said comparison circuit generates first (c1), second (c2) and third (c3) output signals for respectively controlling said first (8), second (20, 21) and third ($20^1$, $21^1$) switching circuits.

* * * * *